(12) United States Patent
Essrig

(10) Patent No.: US 12,435,833 B2
(45) Date of Patent: Oct. 7, 2025

(54) SEISMIC SECUREMENT SYSTEM

(71) Applicant: Michael Essrig, San Diego, CA (US)

(72) Inventor: Michael Essrig, San Diego, CA (US)

(\*) Notice: Subject to any disclaimer, the term of this patent is extended or adjusted under 35 U.S.C. 154(b) by 0 days.

(21) Appl. No.: 18/614,025

(22) Filed: Mar. 22, 2024

(65) Prior Publication Data

US 2024/0318772 A1 Sep. 26, 2024

Related U.S. Application Data

(60) Provisional application No. 63/454,003, filed on Mar. 22, 2023.

(51) Int. Cl.
*F16M 13/02* (2006.01)

(52) U.S. Cl.
CPC .................. *F16M 13/02* (2013.01)

(58) Field of Classification Search
CPC .......................... F16M 13/02; A47B 2097/008
USPC ................................................. 248/499, 500
See application file for complete search history.

(56) References Cited

U.S. PATENT DOCUMENTS

| | | | | |
|---|---|---|---|---|
| 4,325,529 | A * | 4/1982 | Seebinger | F16B 2/08 248/219.4 |
| 5,431,365 | A * | 7/1995 | Hopkins | A44B 11/223 24/178 |
| 5,599,000 | A * | 2/1997 | Bennett | A47B 96/06 24/575.1 |
| 6,796,099 | B1 * | 9/2004 | Georges | E04B 1/41 248/500 |
| 7,861,997 | B2 * | 1/2011 | Brewer, III | B63B 17/0081 248/500 |
| 8,567,742 | B2 * | 10/2013 | Sizelove | H01Q 1/1207 248/500 |
| 8,740,172 | B2 * | 6/2014 | Essrig | A47B 97/00 248/500 |
| 10,856,659 | B1 * | 12/2020 | Stravitz | A47B 97/00 |
| 11,357,328 | B2 * | 6/2022 | Marsden | A47B 97/001 |
| 2014/0263925 | A1 * | 9/2014 | Essrig | A47B 97/00 248/505 |

\* cited by examiner

*Primary Examiner* — Bradley Duckworth
(74) *Attorney, Agent, or Firm* — Donn K. Harms

(57) ABSTRACT

A restraint system is provided for objects to be restrained during seismic events or impacts to the object. The system includes a base which is engaged to the object. A strap extending from a connecting member which is engaged to the base extends to a second end which is in a fixed mount with a wall or other surface. A locking member is engageable with the base to hold the connecting member in an engaged position.

5 Claims, 7 Drawing Sheets

SEISMIC SECUREMENT SYSTEM

This application claims priority to U.S. Provisional Patent Application Ser. No. 63/454,003 filed on Mar. 22, 2023.

BACKGROUND OF THE INVENTION

1. Field of the Invention

The present invention relates to the stabilization of objects during seismic events. More particularly, it relates to a securement system for furniture and office equipment and the like, which is configured to provide an anti-tip-over apparatus which prevents excess movement and toppling thereof during seismic events, such as earthquakes or when such objects are impacted with sufficient force to move them.

2. Background of the Invention

The securement of objects during seismic events, such as earthquakes, has in recent decades of earthquake study, become the subject of much attention and recommendation by government and industry officials to aid with regard to emergency prevention and management. Studies of earthquake occurrences have shown that people, especially children, can be severely injured by common office and household objects should they topple over during such a seismic event.

With regard to earthquakes, the threat of toppling of furniture and expensive electronics increases with the increase in the force of the earthquake. This is a result of increased lateral and, in some cases, vertical movement of supporting floors in homes and offices. Where the furniture, appliances, or office equipment is large or top heavy, seismic movements generated by an earthquake increase the risk of the object rotating away from walls and the like and tipping over. Such results in the possibility of significant injury to occupants of the building. Further, even if large or expensive items and equipment do not topple during an earthquake, they are still prone to position-migration due to the floor surface movement during a seismic event. Such movement can cause other damage or cause items supported by a migrating piece of furniture to topple.

Where large or heavy objects are untethered and allowed unrestricted movement, significant injury or even death can result from tip-overs and toppling and object migration during earthquakes. With an eye on prevention, people and businesses in areas subject to earthquakes have chosen to undergo retrofits of property to secure objects and expensive items inside a building to enhance household and business seismic safety. Such securement may include the engagement of furniture and office and other equipment and breakables to the walls to prevent movement. Even where there is little chance of earthquakes, safety conscious individuals and companies now endeavor to prevent the accidental toppling of equipment and injuries therefrom.

With respect to the above, before explaining at least one preferred embodiment of the securement system herein, it is to be understood that the disclose securement components and system are not limited in application to the details of employment and to the arrangement of the components or the steps set forth in the following description or illustrated in the drawings. The various apparatus and operations of the herein disclosed seismic securement system herein are capable of other embodiments, and of being practiced and carried out in various ways, all of which will be obvious to those skilled in the art once the information herein is reviewed.

Also, it is to be understood that the phraseology and terminology employed herein are for the purpose of description, and should not be regarded as limiting. As such, those skilled in the art will appreciate that the conception upon which this disclosure is based may readily be utilized as a basis for other seismic securement systems. It is important, therefore, that the embodiments, objects and claims herein, be regarded as including such equivalent construction and methodology insofar as they do not depart from the spirit and scope of the present invention.

SUMMARY OF THE INVENTION

The disclosed restraint system herein provides both a device to secure objects and prevent tip-over thereof during seismic events and a method for securing moveable objects to static structural elements of a structure. This securement prevents tip-over toppling and migration of the object in the room during use, accidental impacts, or upon a seismic event.

The disclosed system herein features a base which is operatively engageable to the object chosen for restraint. Such an operative engagement is preferably accomplished using a connector such as adhesive connecting the base to the object. However, fasteners, such as screws or the like, might be employed as a connector where the object is such that screws or mechanical fasteners may be engaged therewith.

A substantially rigid connecting member is removably engageable with the base using projections extending from the base which are positioned to engage through slots or openings formed through the connecting member. By substantially rigid herein is meant, that the connecting member may flex slightly but will maintain a planar shape during use. This connecting member as such is preferably formed of metal or carbon fiber or fiberglass or a strong polymer or another stiff material which when it flexes, retains a planar form.

The substantially rigid connecting member is preferred over the use of a flexible strap by itself in engagement with the base because flexible straps are subject to folding and movement which may allow the base to move excessively. It was found in experimentation that a substantially rigid connecting member will not fold and allow rotational or other movement of the connected base. Further the rigid connecting member provided leverage to resist the force of a moving object better than just a strap and it is easier to engage over the elongated or circular projections rising from the base during use than are flexible straps.

This rigid connecting member, which engages the base on a first end, is engaged at a second end thereof to a first end of a flexible strap or other strong, but flexible, member. This allows the strap to assume different configurations between the connecting member at the first end thereof and the second end of the strap.

The second end of this strap is configured to provide a fixed engagement to a static position or structure, such as a wall, or to a mount or bracket or the like engaged upon the wall or stud, beam, or floor. The second end of the strap itself may be engaged in a fixed position using fasteners or, in a more preferred mode of the system, a mounting bracket is first engaged to a fixed position on the wall or static structure, and the second end of the strap connects to the rigid mounting bracket.

With the second end of the strap so engaged between a fixed mount and the connecting member and with the connecting member removably engaged to the base which is fixed in engagement to the object to be restrained, the object, during a seismic event or when struck with sufficient force to topple it, will instead remain substantially in place.

Further, because the elongated connecting member is substantially rigid, rotational movement of the base and the object connected thereto is much better prevented than if the base was simply connected to the flexible strap. This provides a significant improvement in the prevention of toppling of objects which might occur were they engaged with only a flexible strap to the base.

Particularly preferred in the removable engagement of the connecting member to the base which is adhered or otherwise connected to an object is the provision of a plurality of elongated slots formed into the connecting member. Each of these slots is sized to engage around the perimeter edge of elongated projections which extend above a top surface of the base connected to the object. Such results in multiple elongated connections between the base and the connecting member further enhancing the resistance to rotation of the base as well as the dismounting of the connecting member from the base.

To removably lock the connecting member into a removable engagement with the base, which is connected to the object to be restrained, a locking member is provided. This locking member is engageable to the base by sliding aligned openings formed in the bottom surface thereof over aligned shoulders extending above the top surface of the connecting member. Recesses formed into a bottom surface of the locking member slide over the elongated projections from the base which communicate through respective slots formed into the body of the connecting bracket. This is preferred in that it positions the bottom surface of the locking member against the body of the connecting member on both sides of each of the two elongated projections. This contact not only enhances the removable engagement between the connecting member and the base, it also has been found in experimentation to prevent bowing and twisting of the connecting member which might cause a dismount thereof from the base.

With respect to the above description, before explaining at least one preferred embodiment of the seismic securement system herein, in detail, it is to be understood that the system and invention herein is not limited in its application to the details of operation nor the arrangement of the components or steps set forth in the following description or illustrations in the drawings. The various methods of implementation and operation of the disclosed securement system invention are capable of other embodiments and of being practiced and carried out in various ways which will be obvious to those skilled in the art, once they review this disclosure. Also, it is to be understood that the phraseology and terminology employed herein are for the purpose of description and should not be regarded as limiting.

Therefore, those skilled in the art upon reading this disclosure will appreciate that the conception upon which this disclosure is based may readily be utilized as a basis for designing of other devices for restraining objects from tip-over or migration during seismic events. It is important, therefore, that the objects and claims be regarded as including such equivalent construction and methodology insofar as they do not depart from the spirit and scope of the present invention.

It is an object of this invention to provide a restraint system for securing objects, such as furniture and office equipment, from toppling and/or movement during use or during a seismic event.

It is an object of this invention to provide such a restraint which employs an adhesive engaged base which is configured to easily engage and disengage with a substantially rigid connecting member which holds the base and the object attached thereto in place.

It is a further object of this invention to enhance the resistance to twisting or rotational movement of the secured object through the employment of a strap-engaged substantially rigid connecting member that is removably engaged with the base.

These together with other objects and advantages which become subsequently apparent, reside in the details of the construction and operation of the disclosed and described seismic restraint system herein as more fully hereinafter described and claimed, reference being had to the accompanying drawings forming a part thereof, wherein like numerals refer to like parts throughout. Further objectives of this invention will be brought out in the following part of the specification wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
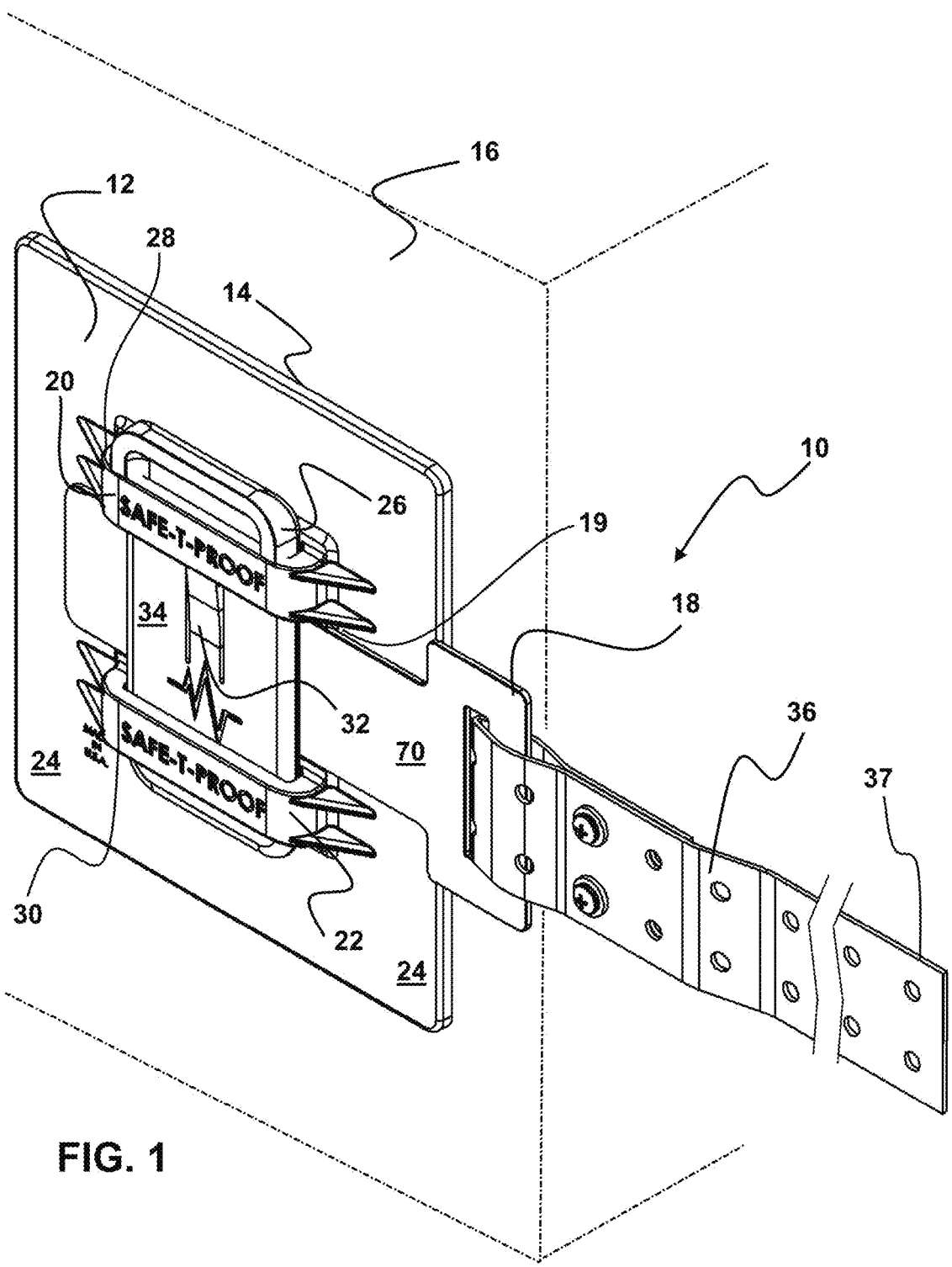
FIG. 1 depicts a perspective view showing a base of the device operatively engaged with an object to be secured and shows the rigid connecting member engaged on a first end with the base and opposing end with a securement strap.

Referring now to the drawings of FIGS. 1-13, there is seen in FIG. 1 a perspective view of the device 10 in an assembled configuration. As shown, a base 12 of the device 10 is operatively engaged to an object 16. By operatively engaged is meant that the base 12 is connected to the object 16 of choice, such as with a connector such as adhesive 14, preferably, or in some cases the connector may be fasteners, such as screws or mating fasteners. Such objects 16, for example, and in no way limiting, may be filing cabinets, computers, printers, tables, desks, or any other object 16 as would occur to those skilled in the art which may be prevented from excess movement during a seismic event such as an earthquake.

With the base 12 so engaged to an object 16 by a connector, such as adhesive or mechanical fasteners, a connecting member 18 is removably engaged with the base 12 by positioning thereof in an engaged position extending through a pathway 19 located in between a first shoulder 20 and a second shoulder 22. Both the first shoulder 20 and second shoulder 22 project from and above a top surface 24 of the base 12 and run substantially parallel to each other.

To removably hold the connecting member 18 to this engaged position, a locking member 26 is positionable to cover the connecting member 18. The locking member 26 is removably engageable to an engaged position with the base 12 by sliding it into a first passage 28 communicating through the first shoulder 20 and a second passage 30 communicating through the second shoulder 22. The locking member 26 preferably includes a deflectable or depressible lock 32 which is biased by default, to flex and then rebound to project above an upper surface 34 of the locking member 26. The depressible lock 32 in contact against an inner surface of the first shoulder 20 will prevent a sliding of the locking member 26 from this locking position. Depressing the lock 32 to deflect it below the inside edge of the first shoulder allows it and the locking member 26 to slide through the first passage 28 thereby allowing the locking member 26 to be removed from the engaged or locking position shown in FIG. 1 and FIG. 11.

The device 10 in all modes, also includes a strap 36. The strap is formed of flexible material and is engaged at a first end to the connecting member 18. A second end 37 of the strap 36 is for securement thereof to a fixed mount (not shown but well known), such as with fasteners engaging the second end to a wall, stud, or any fixed mount or another fixed position. With the second end 37 of the strap 36 so engaged and the first end of the strap 36 connected to the connecting member 18 and the connecting member 18 removably engaged with the base 12, any object 16 engaged to the base 12 is restrained from substantial movement in a direction away from the strap 36. The flexible strap 36 will allow some slight movement of the restrained object but will stop the object from tilting or falling or moving across a floor during an earthquake.

Particularly preferred, to enhance this restraint of the object 16, is the formation of all modes of the base 12, such as in FIGS. 2-5, with elongated connections of the base 12 to the connecting member 18. The elongated connection between the connecting member 18 and the base 12 in the pathway 19 at preferably two locations significantly enhances support of engagement of the connecting member 18 to the base 12 to resist twisting or rocking or rotation thereof which might damage the first shoulder 20 or second shoulder 22. With that base 12 connected to the object 16, resistance to both lateral movement or a pulling of the connecting member 18 along the axis of the strap 36 and rotational or twisting movement of the connecting member 18 when engaged in the pathway 19 in between the first shoulder 20 and second shoulder 22 is thereby provided.

Figure 2:
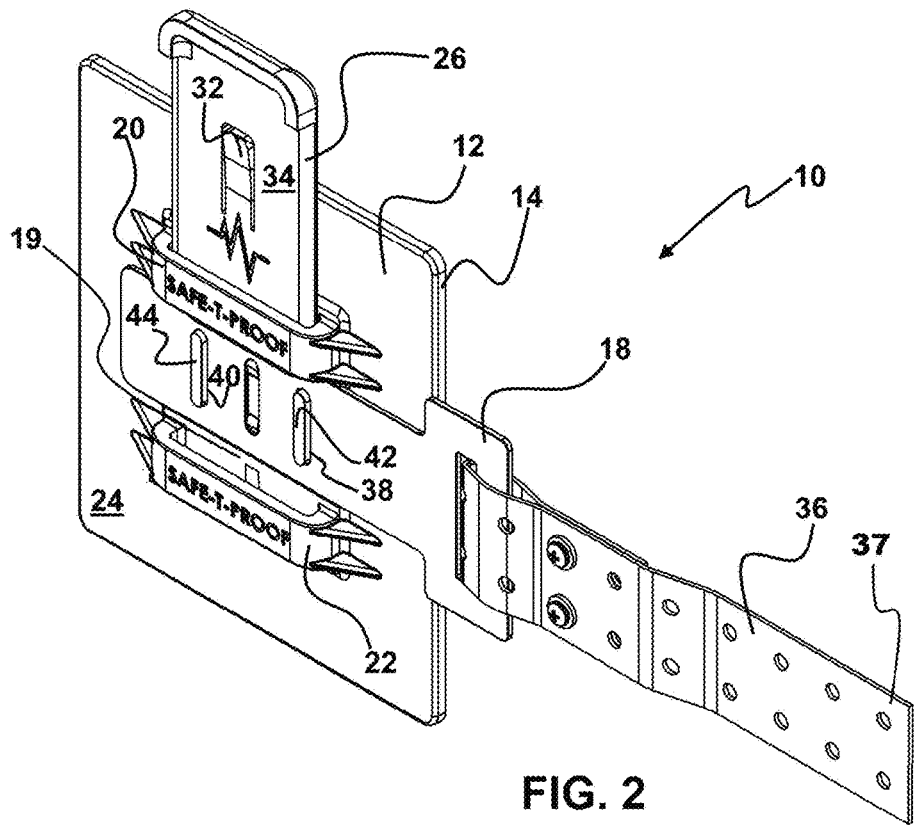
FIG. 2 depicts the device, as in FIG. 1, and shows elongated slots in the connecting member engaged with the elongated projections extending from the base, showing the locking member positioned to slide into engagement with openings in first and second shoulders.
Figure 3:
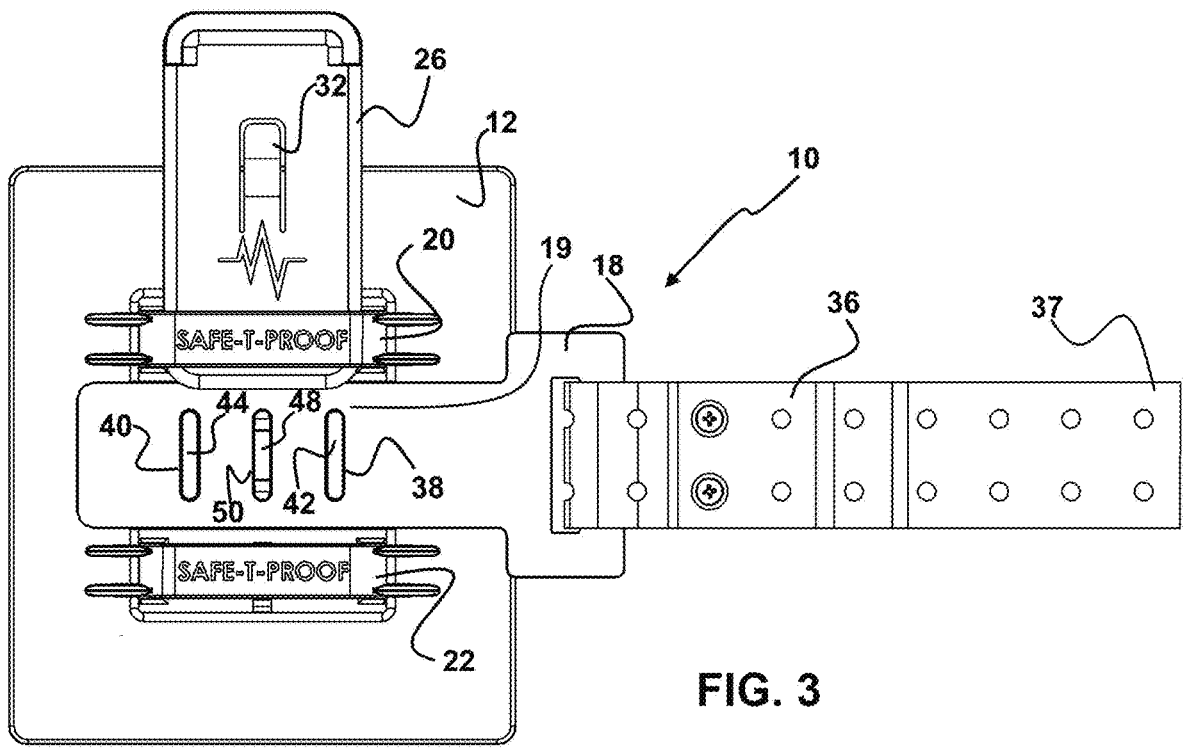
FIG. 3 is an overhead view of the device, as in FIG. 2.
Figure 4:
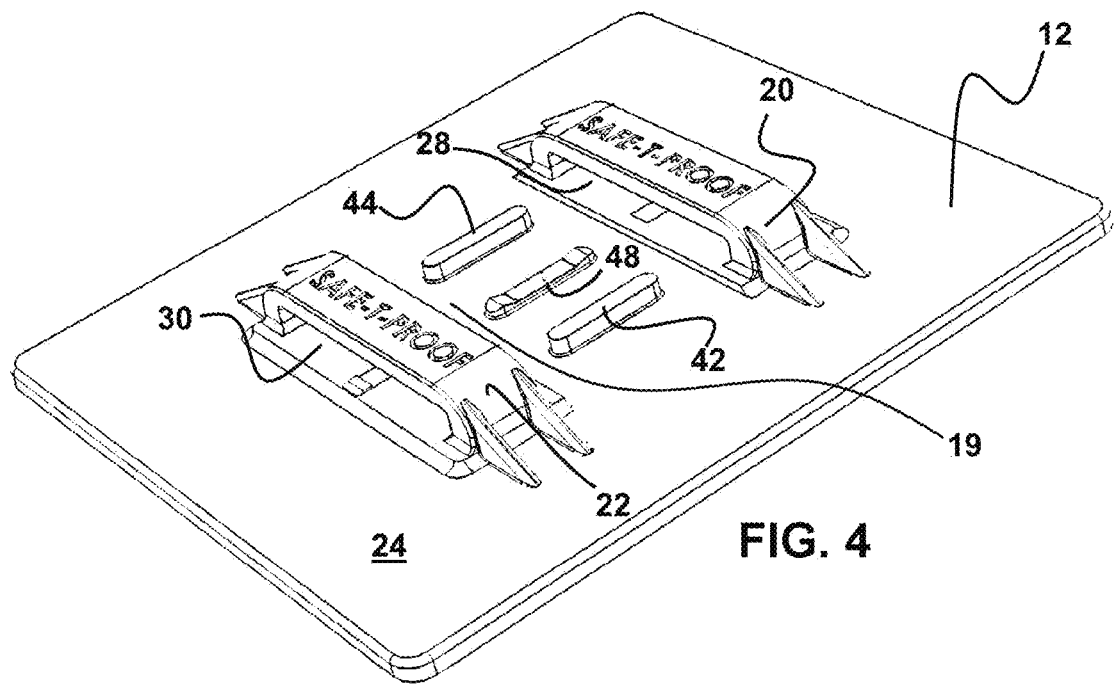
FIG. 4 depicts an especially preferred configuration for the base of the device wherein two elongated projections extend above the surface of the base in the pathway in between the first and second shoulders of the base.
Figure 10:
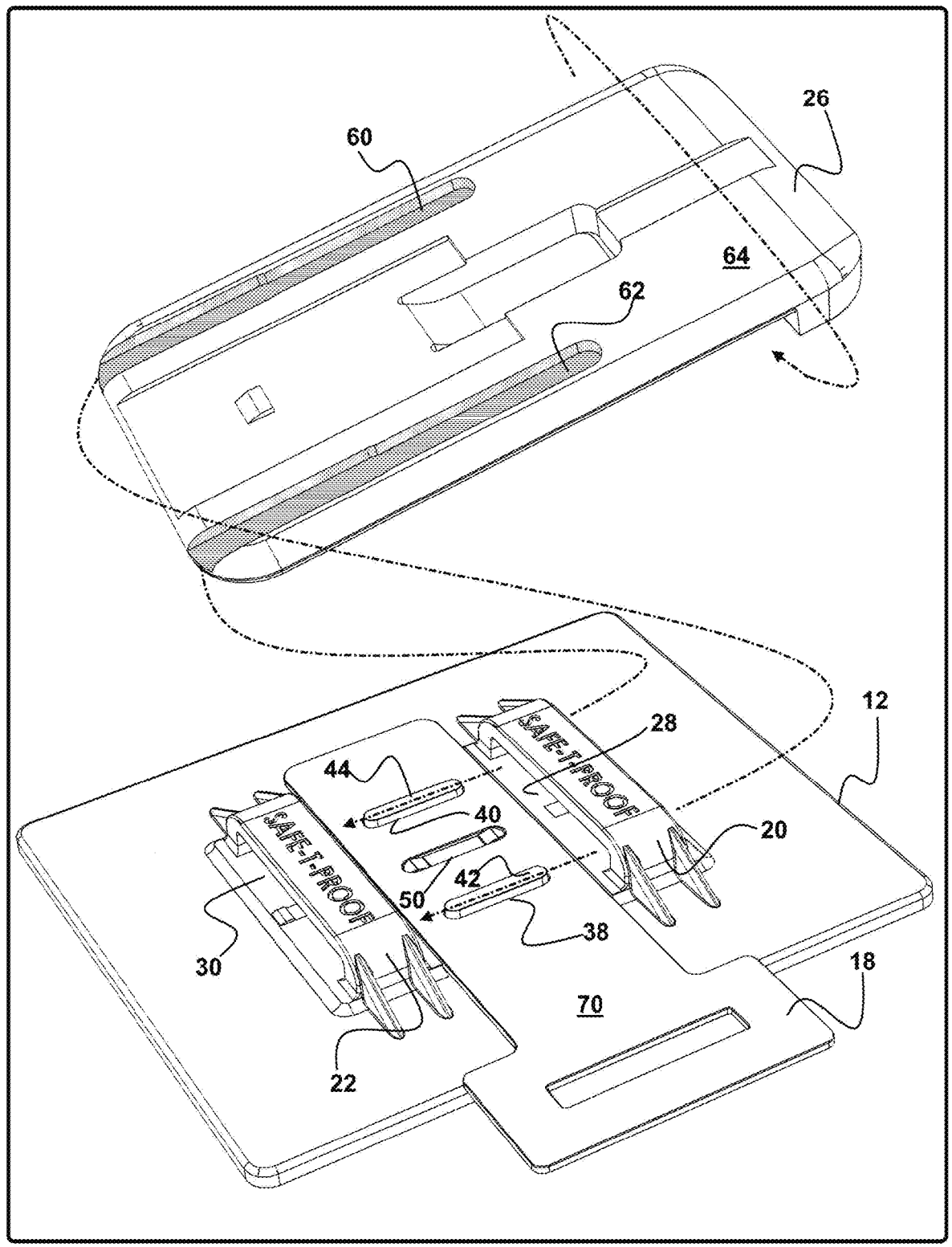
FIG. 10 shows a mode of the lower side surface of the preferred locking member which is engageable in all modes of the base of the device, wherein first and second elongated recesses in the lower surface align with and slide over the first and second elongated projections or pairs thereof extending from the top surface of the base.

As shown in FIGS. 2-3 and 10, the elongated connecting member 18 has a first slot 38 communicating through the body of the connecting member 18 which is sized to engage around the perimeter edge of a first elongated projection 42. A second elongated slot 40 communicating through the body of the connecting member 18 likewise has an interior circumference sized to slide upon the exterior circumference of the second elongated projection 44 extending from the top surface 24 of the base 12. These elongated connections of the interior circumference of the elongated slots 38 and 40 against the exterior circumference of each of the first elongated projection 42 and second elongated projection 44 are especially preferred in that a significant increase in strength of the removable engagement to the connecting member 18 is provided. Further, as noted, leverage is formed with these elongated engagements to resist twisting or rotation of the base 12. This rotational resistance, along with the rigid connecting member 18 engaged to the rigid base 12, significantly helps prevent the object 16 connected to the base 12 from rotational or twisting movement which can result in it falling forward or rearward if it is stacked.

Additionally provided by the engagement of the exterior circumference of the first elongated projection 42 and second elongated projection 44 with the interior edge of the first elongated slot 38 and second elongated slot 40 is a significant enhancement in the strength of the engagement of the connecting member 18 to the base 12. This allows the device 10 to be employed to hold objects 16 of higher weight or mass than can be held with simple pegs engaged through openings in a flexible strap 36 which will more easily tear under such pressure and force.

Also shown in FIGS. 2-4 and 6-7 are a central projection 48. This central projection 48 is positioned to form an engagement through both of two ends of a central slot 50 communicating through the body of the elongated connecting member 18 in between the first elongated slot 38 and second elongated slot 40. While the device 10 will function without the central projection 48 effectively, where employed, portions of it provide a safety to prevent unlocking of the connecting member 18, and all three slots are preferably substantially parallel and positioned to engage over all three projections extending from the top surface 24 of the base 12.

A recess 52 is formed into a central area of this central projection 48, when included, and the extension of the recess 52 in the central projection 48 from the top surface 24 of the base 12 is preferably less than the thickness of the material forming the connecting member 18 surrounding the central slot 50 formed into the connecting member 18. The lowered distance of extension above the top surface 24 of the base of the two ends 53 of the central projection 48 operate to contact a lower side of the depressible lock 32 to keep the contact end of the lock from dipping below the first shoulder 20 edge without being depressed and flexed to do so. The recess 52 also defines a cavity into which the lock 32 may be slightly depressed and deflected by the user to lower the edge of the lock 32 below the inside edge of the first shoulder 20 (FIG. 12) during insertion and removal of the locking member 26 from its engagement to the base 12.

Figure 5:
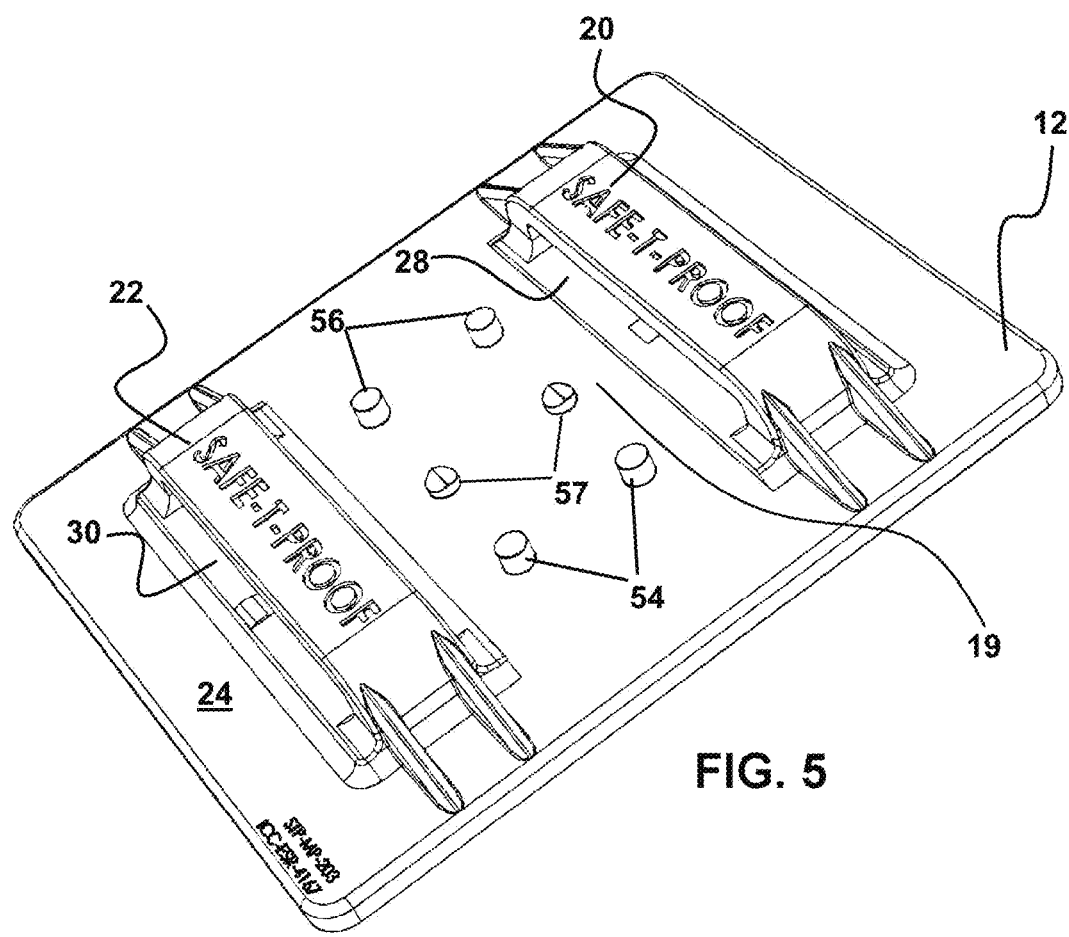
FIG. 5 shows another mode of the base wherein aligned projection points are positioned on the base in the pathway between the first and second shoulders of the base which engage through opposing ends of slots in the connecting member.

Shown in FIG. 5 is another mode of the base 12 of the device 10 which includes first and second projections in engagement to the connecting member 18 which provides the resistance to twisting. As shown, there are aligned protrusions positioned in aligned pairs which are spaced to provide the projection for engagement within and at opposing ends of the first elongated slot 38 and second elongated slot 40, respectively.

The first projection is formed by an aligned pair of protrusions 54 which are located on the base 12 to engage opposing ends of the first elongated slot 38. The second projection is formed by a second aligned pair of protrusions 56 which are located on the base 12 in a spaced positioning to concurrently engage through and with the opposing ends of the second elongated slot 40 therein. The configuration of the central projection 48 is provided by a third pair of aligned protrusions 57 which are shorter in height than the first and second pair of protrusions. This configuration, while not quite as strong as that using elongated first and second projections 42 and 44, still provides significant resistance to rotation and twisting by engaging opposite ends of the elongated slots 38 and 40 in the body of the connecting member 18. The third aligned pair of protrusions 57, located in between the first and second pair of elongated protrusions, has a lower profile to allow engagement with both ends of a central slot 50 without projecting above it.

Figure 6:
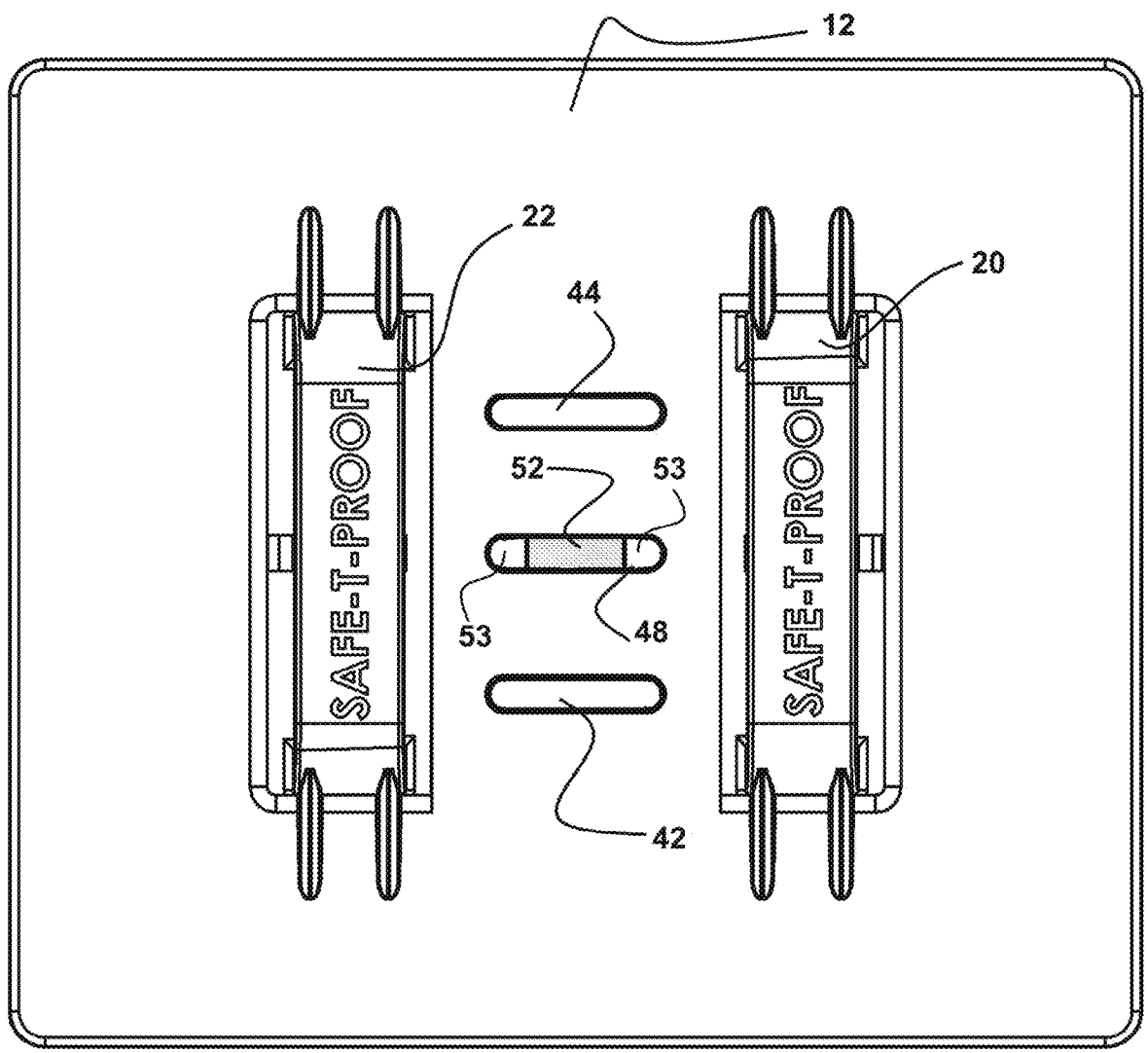
FIG. 6 is an overhead view of the base, as shown in FIG. 4.
Figure 7:
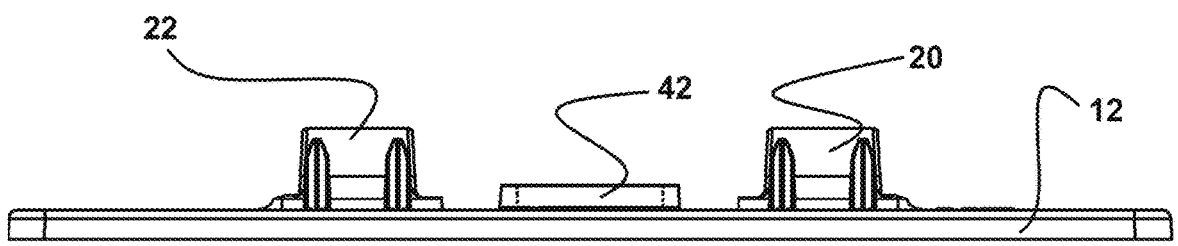
FIG. 7 shows a side view of the base of FIG. 6.

Another view of the base 12, having the aligned elongated first elongated projection 42 and second elongated projection 44, is shown in FIGS. 6-7. As noted above, a third elongated projection or central projection 48 is located in between the first and second elongated projections 42 and 44 and runs substantially aligned with and parallel to both of them. A recess 52 depends into this central projection 48 and the opposing ends 53 thereof on opposite sides of the recess 52 project a distance from the top surface 24 sufficient to contact the lower surface of the lock 32 in a manner to hold it in locked position until flexed to unlock by the user.

Figure 8:
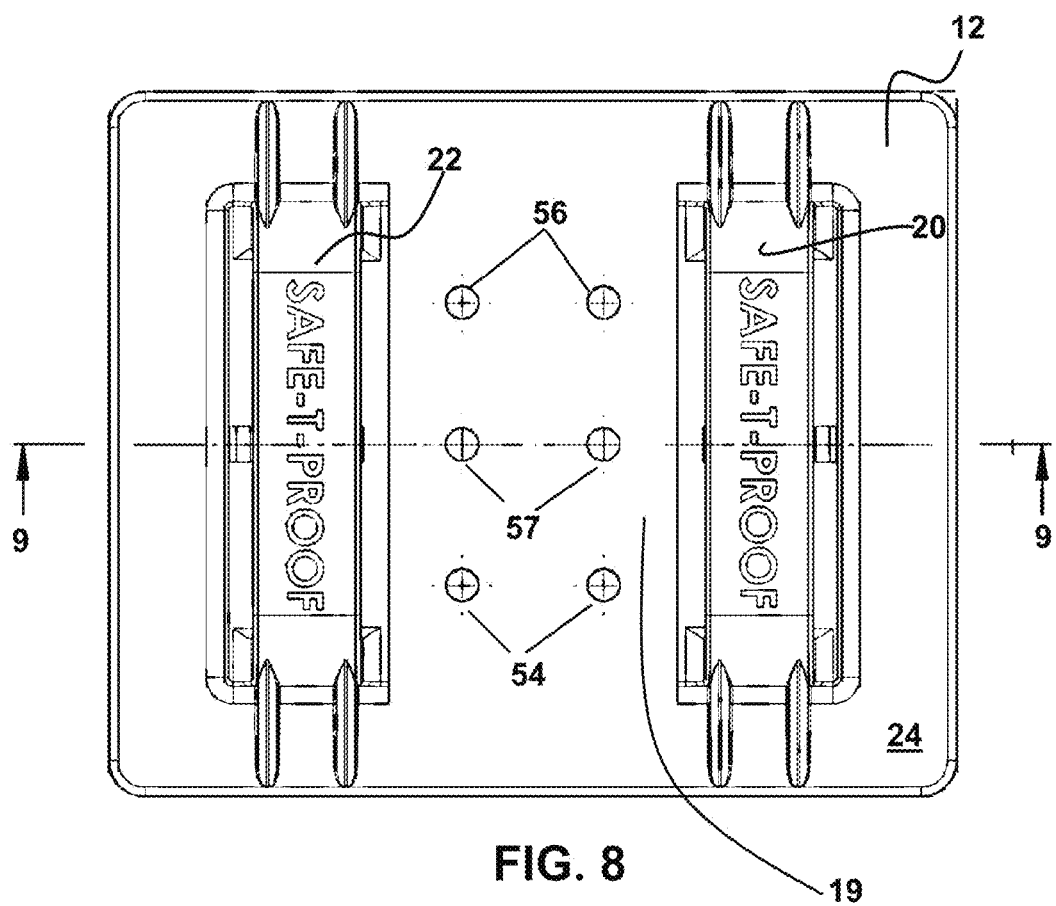
FIG. 8 depicts an overhead view of the base, as in FIG. 5.
Figure 9:
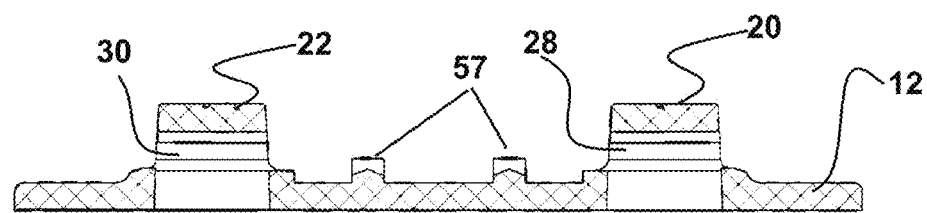
FIG. 9 is a sectional view through the base of FIG. 8.

FIGS. 8-9 show the mode of the device 10, as described in FIG. 5 above. As shown in this mode of the device 10, rather than employing a first elongated projection 42 and second elongated projection 44 as projections to engage respective aligned slots in the connection member 18, a first pair of protrusions 54 are spaced in positions rising from the mount 12 to engage within opposing ends of the first elongated slot 38. and a second pair of protrusions 56 extend from the base 12, in spaced positions, to engage through the second elongated slot 40 substantially at opposite ends thereof. This configuration provides a strong mount and resistance to rotation or twisting of the mount 12 and any object 16 connected thereto.

Shown in FIG. 10 is a mode of the device 10 having a locking member 26 which includes elongated recesses 60 and 62. As shown, the bottom surface 64 of the preferred locking member 26 is engageable to either type of base 12 shown in FIGS. 4-5. In this configuration, preferred for a stronger connection, a first elongated recess 60 and second elongated recess 62 are formed into the bottom surface 64 of the locking member 26.

The first elongated recess 62 will slide over the first elongated projection 42 when it projects through and above the top surface 70 of the connecting member 18. The second elongated recess 62 will slide over the end of the second elongated projection 44 when it projects through and above the top surface 70 of the inserted connecting member 18. Where the projections are provided by the aligned pairs of projections, the first recess 60 in the bottom surface 64 of the locking member 26 is positioned to align with and slide over the aligned first pair of protrusions 54 when they protrude from their engagement through the connection member 18. The second recess 62 therein is positioned to align with and slide over the second pair of aligned protrusions 56 when employed.

This configuration of the first and second pairs of projections 54 and 56, as well as the mode of positioning of the first elongated projection 42 and second elongated projection 44 in positions to align with the first elongated recess 60 and second elongated recess 62, is especially preferred. This is because it provides for contact of the bottom surface 64 of the locking member 26 immediately adjacent or substantially in contact against the top surface 70 of the connection member 18 on opposing sides of each of the first elongated projection 42 and second elongated projection 44 or the first pair of projections 54 and second pair of projections 56. This contact was shown, during experimentation, to better hold the connection member 18 tightly in place, in that it prevented bowing or deflection thereof during high force.

Figure 11:
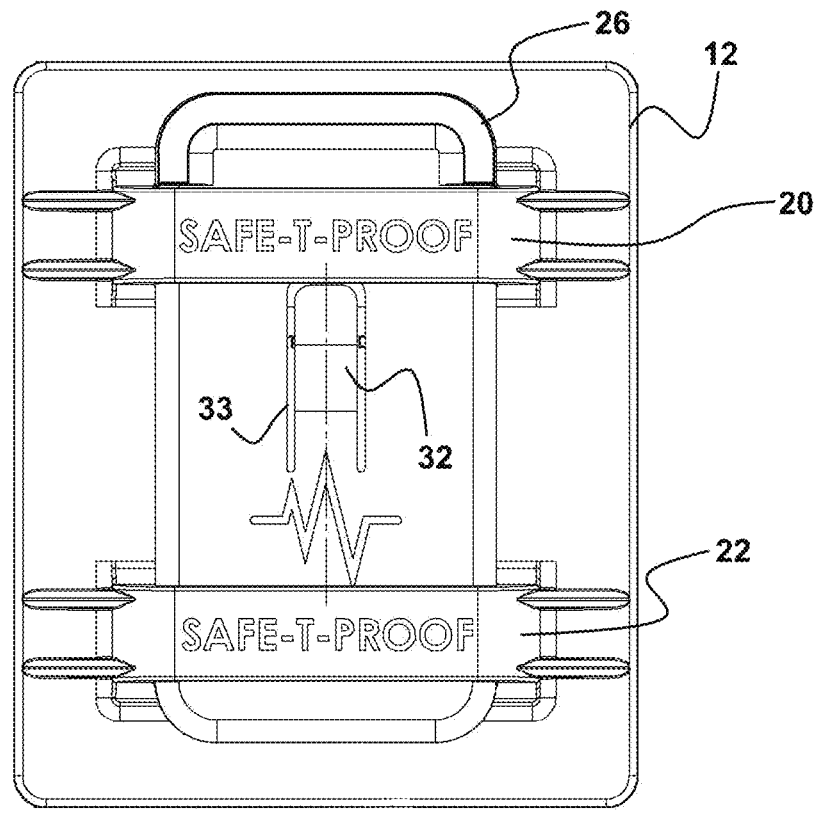
FIG. 11 is a top view of the device herein showing the locking member removably engaged to the base similar to that of FIG. 1 but without the strap and engaged connecting member.

Shown in FIG. 11 is a top view of the device 10 herein showing the locking member 26 removably engaged to the base 12 similar to that of FIG. 1 but without the strap 36 and engaged connecting member 18.

Figure 12:
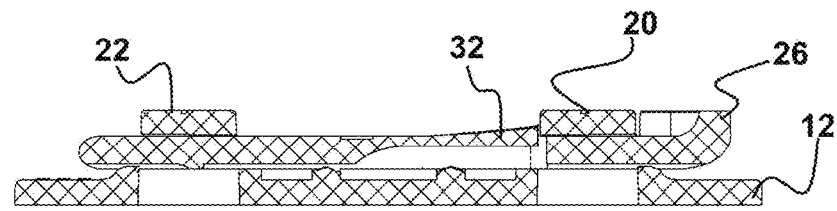
FIG. 12 shows a sectional view through the center of the locking member in its engagement to the base.

Depicted in FIG. 12 is a sectional view through the center of the engaged locking member 26 and base 12 of FIG. 11. As shown, with the locking member 26 engaged through the first passage 26 in the first shoulder 20 and second passage 30 in the second shoulder 22, the deflectable lock 32 moves to the default position where the lock 32 contacts the first shoulder 20 and thereby prevents removal of the locking member 26.

Figure 13:
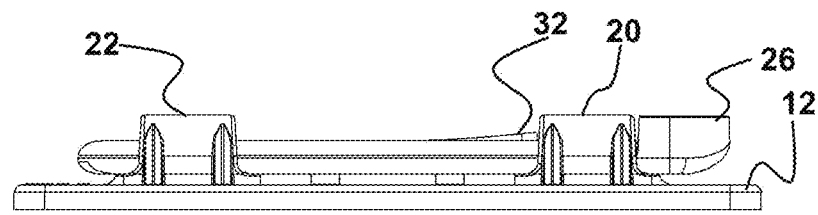
FIG. 13 shows a side view of the device herein as in FIG. 11, showing the depressible lock on the locking member flexed or biased to the lock position wherein contact thereof with the first shoulder prevents removal of the locking member from the base.

As noted, the lock 32 is a flexible section of the locking member 26 having an opening 33 surrounding it and communicating through the body of the locking member 26. Depressing the lock 32 will lower it from the default biased position and below the edge of the first shoulder 20 wherein it and the locking member 26 will pass through the first passage 28 during removal. During insertion pushing on the first end of the locking member 26 provides sufficient force to overcome the bias of the lock 32 to the default position, and thereby allows it to pass through the first passage 28. The engaged position of the locking member 26 to the base 12 is also shown in FIG. 13.

While all of the fundamental characteristics and features of the disclosed seismic restraint system for have been shown and described herein, with reference to particular embodiments thereof, a latitude of modification, various changes and substitutions are intended in the foregoing disclosure and it will be apparent that in some instances, some features of the restraint system invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A restraint system for objects to be restrained during seismic events or impacts thereto, comprising:
   a base, said base engageable to an object to be restrained;
   a connector to engage said base to said object to a mounted position on said object;

said base having a pathway thereon running between a first shoulder and a second shoulder;

a strap having a first end engaged with a connecting member, said strap having a second end for engagement to a fixed position on a mount;

said connecting member having a planar portion positionable to an engaged position within said pathway;

a first passage communicating through said first shoulder opposite a second passage communicating through said second shoulder;

a first projection extending within said pathway from said top surface of said base;

a first slot communicating through said planar portion of said connecting member;

said first projection being positioned within said first slot with said planar portion of said connecting member located in said engaged position thereof;

a second projection extending within said pathway from said top surface of said base;

a second slot communicating through said planar portion of said connecting member;

said second projection being positioned within said second slot with said planar portion of said connecting member located in said engaged position thereof;

a locking member insertable to an engaged position having a respective portion thereof positioned within each of said first passage and said second passage;

said planar portion of said connecting member in said engaged position thereof, located to a sandwiched positioning in between a top surface of said base and a bottom surface of said locking member with said locking member in said engaged position thereof;

a first recess formed into said bottom surface of said locking member;

a second recess formed into said bottom surface of said locking member;

said first recess slidably engageable over said first projection during insertion of said locking member to said engaged position; and said second recess slidably engageable over said second projection during said insertion of said locking member to said engaged position.

2. The restraint system for objects to be restrained of claim 1 additionally comprising:

a lock formed into said locking member; and said lock having a default position having an edge of said lock projecting above a top surface of said locking member; and contact of said edge with one of said first shoulder or said second shoulder with said lock in said default position preventing removal of said locking member from removal from said engaged position thereof.

3. The restraint system for objects to be restrained of claim 1 additionally comprising:

a central projection extending within said pathway from said top surface of said base, said central projection positioned in between said first projection and said second projection;

a third slot communicating through said planar portion of said connecting member;

said central projection being positioned within said third slot with said planar portion of said connecting member located in said engaged position thereof; and said central projection forming a contact against a bottom surface of a lock, with said locking member in said engaged position thereof.

4. A restraint system for objects to be restrained during seismic events or impacts thereto, comprising:

a base, said base engageable to an object to be restrained;

a connector to engage said base to said object to a mounted position on said object;

said base having a pathway thereon running between a first shoulder and a second shoulder;

a strap having a first end engaged with a connecting member, said strap having a second end for engagement to a fixed position on a mount;

said connecting member having a planar portion positionable to an engaged position within said pathway;

a first passage communicating through said first shoulder opposite a second passage communicating through said second shoulder;

a locking member insertable to an engaged position having a respective portion thereof positioned within each of said first passage and said second passage;

said planar portion of said connecting member in said engaged position thereof, located to a sandwiched positioning in between a top surface of said base and a bottom surface of said locking member with said locking member in said engaged position thereof;

a first projection extending within said pathway from said top surface of said base;

a first slot communicating through said planar portion of said connecting member;

said first projection being positioned within said first slot with said planar portion of said connecting member located in said engaged position thereof;

a lock formed into said locking member;

said lock having a default position having an edge of said lock projecting above a top surface of said locking member;

contact of said edge with one of said first shoulder or said second shoulder with said lock in said default position preventing removal of said locking member from removal from said engaged position thereof;

a second projection extending within said pathway from said top surface of said base;

a second slot communicating through said planar portion of said connecting member;

said second projection being positioned within said second slot with said planar portion of said connecting member located in said engaged position thereof;

a first recess formed into said bottom surface of said locking member;

a second recess formed into said bottom surface of said locking member;

said first recess slidably engageable over said first projection during insertion of said locking member to said engaged position; and said second recess slidably engageable over said second projection during said insertion of said locking member to said engaged position.

5. The restraint system for objects to be restrained of claim 4 additionally comprising:

a central projection extending within said pathway from said top surface of said base, said central projection positioned in between said first projection and said second projection;

a third slot communicating through said planar portion of said connecting member;

said central projection being positioned within said third slot with said planar portion of said connecting member located in said engaged position thereof; and said central projection forming a contact against a bottom surface of said lock, with said locking member in said engaged position thereof.

* * * * *